United States Patent [19]
Clare

[11] Patent Number: 5,031,727
[45] Date of Patent: Jul. 16, 1991

[54] LIFT FOR VEHICLES

[76] Inventor: Lloyd E. Clare, 399 Dunvegan Drive, Waterloo, Ontario, Canada, N2K 2C6

[21] Appl. No.: 473,608

[22] Filed: Feb. 1, 1990

[30] Foreign Application Priority Data

Feb. 3, 1989 [GB] United Kingdom ................ 8902471

[51] Int. Cl.[5] .......................... B60S 13/00; B66F 7/00

[52] U.S. Cl. ................................ 187/8.59; 187/8.41; 187/9 R; 296/26; 296/27; 414/495

[58] Field of Search .................... 187/8.41, 8.45, 8.47, 187/8.59, 8.77, 9 R; 296/26, 27; 414/228, 495, 537

[56] References Cited

U.S. PATENT DOCUMENTS

| | | | |
|---|---|---|---|
| 1,771,054 | 7/1930 | McConnell | 187/8.59 |
| 3,395,777 | 8/1968 | Rodosta | 187/8.59 |
| 3,536,161 | 10/1970 | Clarke | 187/9 R X |
| 3,870,339 | 3/1975 | Goff | 414/495 X |
| 4,113,301 | 9/1978 | Olmstead | 296/27 X |
| 4,232,488 | 11/1980 | Hanley | 296/26 X |

FOREIGN PATENT DOCUMENTS

| | | | |
|---|---|---|---|
| 1912640 | 9/1970 | Fed. Rep. of Germany | 187/8.59 |
| 1051805 | 1/1954 | France | 187/8.59 |
| 0529921 | 12/1940 | United Kingdom | 187/8.59 |

*Primary Examiner*—H. Grant Skaggs
*Assistant Examiner*—Tuan N. Nguyen
*Attorney, Agent, or Firm*—Anthony Asquith & Co.

[57] ABSTRACT

The lift is movable from site to site, and is suitable for lifting wide vehicles, such as trucks. The lift comprises a rectangular base frame (12) to which are hinged two side wings (14). The side wings fold up for transit. Corner pillars (16) for raising the vehicle are located on the side wings. Hydraulic actuators (56) are located inside the crossbeams (20) which bridge between the corner pillars. The lift includes jacklegs (25) which are used to raise the side wings, and to jack the lift for assembling road wheels.

10 Claims, 6 Drawing Sheets

25
12
14
32
38
46
48
49
50
47
54
52
27
29
30
34
36
40
21

Fig 6
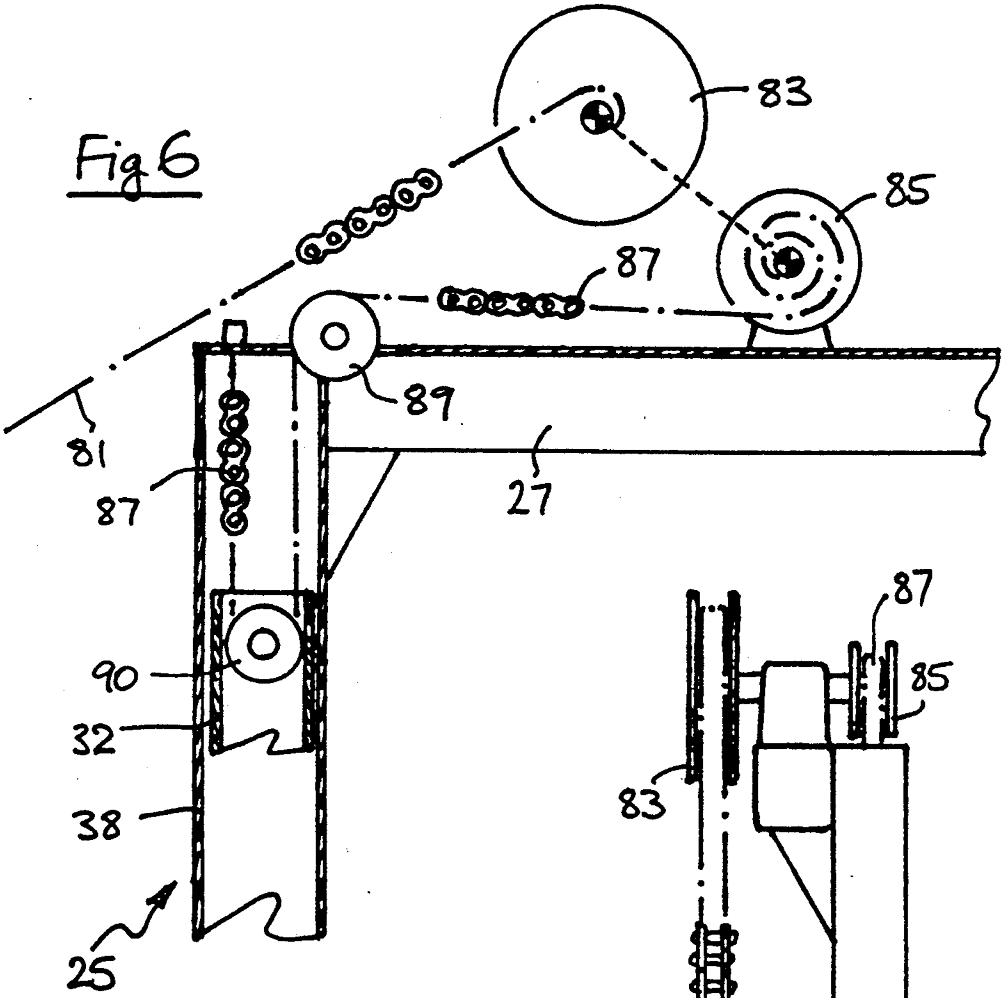
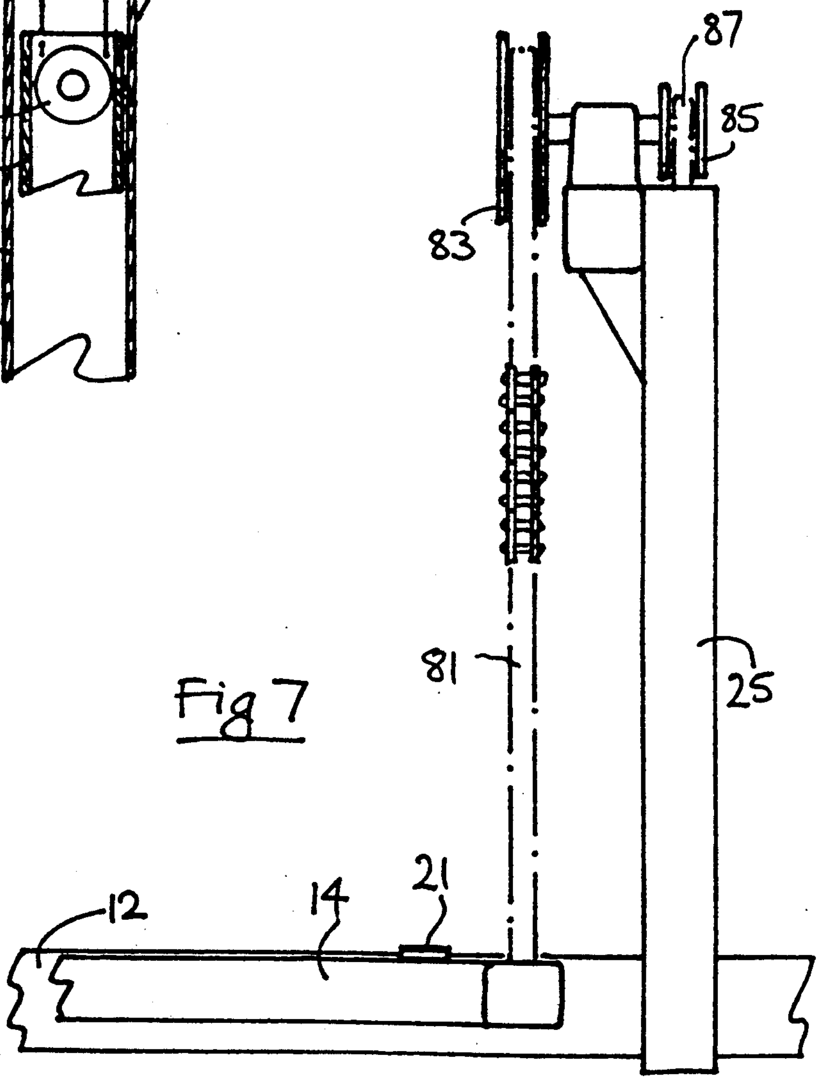
Fig 7

LIFT FOR VEHICLES

This invention is in the field of hoists or lifts for vehicles, such lifts being used for the purpose of lifting a vehicle to provide access to its underside for servicing. Some aspects of the invention are especially applicable to the raising of trucks or other large vehicles. Other aspects of the invention are especially applicable to lifts of the portable type, i.e. lifts which can be moved from site to site.

BACKGROUND TO THE INVENTION

Whilst portable lifts are well known for lifting small vehicles, such as cars, previous design proposals for a portable lift for large vehicles, such as trucks and buses, however, have not proved viable. To be commercially useful as a portable lift, the lift must of course first be large enough and strong enough, when laid out and ready for use, to accept the large vehicle, and yet the lift must be manageable enough for easy transport from site to site along a highway. As regards dimensions, a portable lift for trucks should provide a working headroom under the bottom of a raised vehicle of about 2 meters, which generally means that the lift should have a powered rise of about 1.5 meters; and the lift should be wide enough and long enough to provide access to a vehicle of 9 or 10 meters wheelbase, and 2.6 meters width. In fact, the width of the access preferably should be closer to about 3.3 meters, to accommodate such things as side mirrors etc on the vehicle. When in the ready-for-the-highway, or transit, condition, the lift itself should be no larger than about 8.5 m long, 2.6 m wide, and 3.3 m high.

Prior to a description of the general features and scope of the invention, an exemplary embodiment of the invention will be described with reference to the accompanying drawings.

The lift shown in the accompanying drawings and described below is an example of a lift which embodies the invention. It should be noted that the scope of the invention is defined by the accompanying claims, and not necessarily by features of specific embodiments.

DETAILED DESCRIPTION OF PREFERRED EMBODIMENT

FIG. 6 is a cross-section of an alternative form of jackleg and associated components;

FIG. 7 is a side elevation of the jackleg of FIG. 6.

Figure 1:
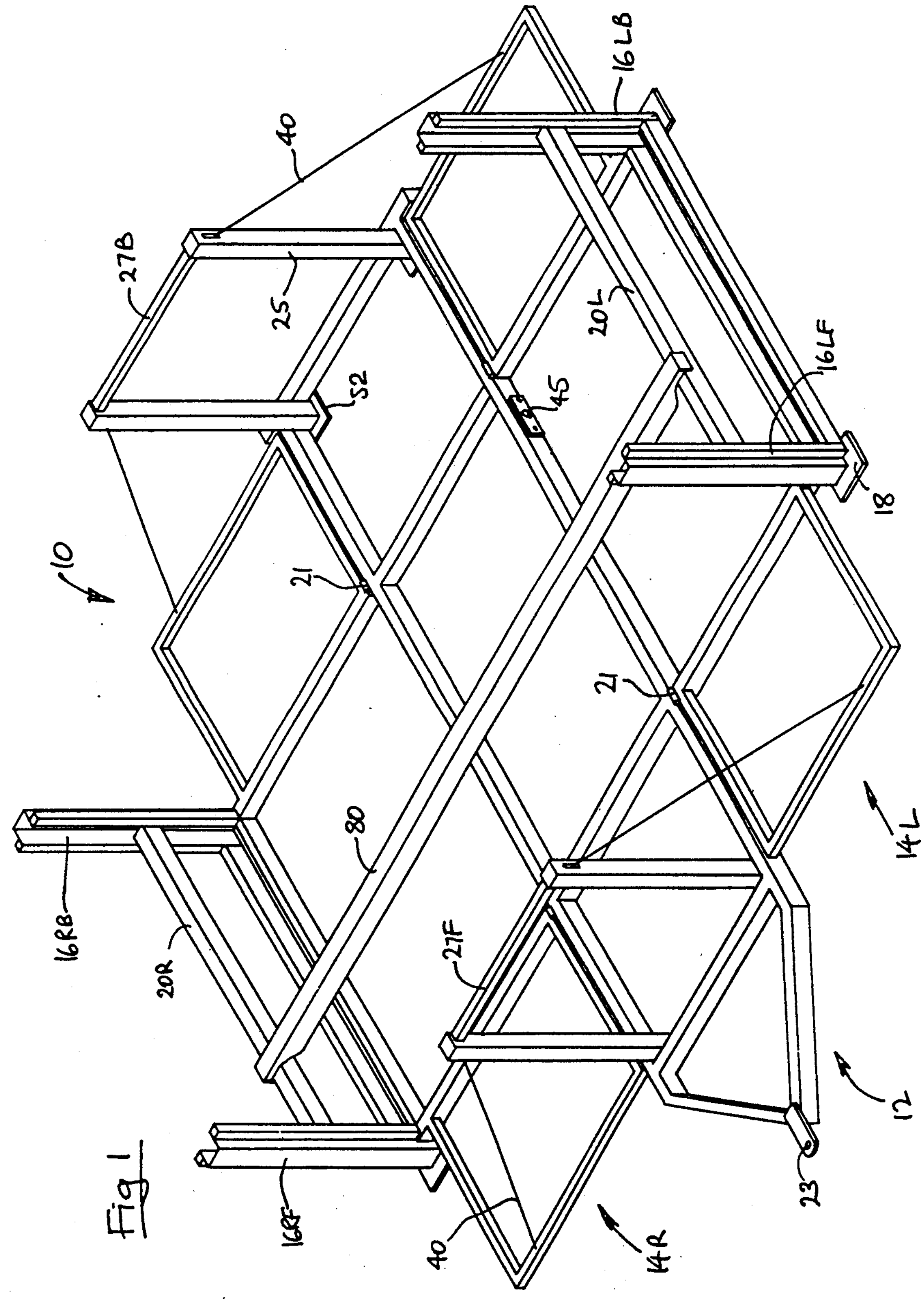
FIG. 1 is a pictorial view of a lift which embodies the invention, in the operational, partially raised, position.

In the lift 10 shown in FIG. 1, a base frame 12 is basically a rectangle, which has an overall length and width of 6.5 m by 1.8 m, and is constructed of steel tubing. Left and right side wings 14L, 14R are provided, one at each side of the base frame 12. The side wings 14 are hingedly mounted on the long side edges of the base frame 12, whereby the side wings are able to rotate from the plane of the base frame upwards through 90 degrees to planes normal to the plane of the base frame.

In the drawings, the overall dimensions of the components are substantially relatively in scale, although the thicknesses and cross-sectional dimensions of some of the components have been exaggerated for clarity.

The lift includes four corner pillars 16, which are mounted one pair 16LF, 16LB to the left side wing 14L, and the other pair 16RF, 16RB to the right side wing 14R. (Ie, F=front, B=back, L=left, and R=right. The lift is generally symmetrical, left to right, and only one side is described.)

At the base of each corner pillar 16 is a respective foot 18. The feet 18 comprise the main points of contact upon and through which the weight of the raised vehicle is transmitted to the supporting ground.

The corner pillars 16 include steel channels, as shown. In respect of the pair of corner pillars 16L, i.e. the pair of corner pillars 16FL, 16BL which are unitary with the side wing 14L, the corner pillars 16LF, 16LB comprising that pair are disposed such that the open sides of the channels lie facing each other. Thus placed, the channels act as guideways for guiding the up/down motion of a crossbeam 20.

The crossbeam 20 spans the distance between the corner pillars 16F, 16B. The crossbeam 20 is made from rectangular tubing, and housed within this tubing is the main hoisting mechanism of the lift, which is described in detail below, for raising and lowering the crossbeam relative to the corner pillars.

As noted above, the side-wings 14 are not fixed to the base frame 12 but are able to be pivoted upwards (upon hinges 21) for the purpose of folding up the lift, so as to permit the lift to travel along the highway. Provision is made, at 23, for hitching the folded-up lift to a suitable vehicle.

The manner by which the pivoting and raising of the side wings is controlled will now be described. Positioned at suitable locations on the base frame 12 are four jacklegs 25, arranged one to the front and one to the back of each side wing. The front jacklegs 25RF, 25LF are connected at their top ends by a front bar 27F, the back jacklegs 25RB, 25LB being connected by a corresponding back bar 27B.

Within each jackleg 25, a respective hydraulic ram 29 is located. A first pulley 30 is attached—via a slide-piece 31, the purpose of which is described below—to the piston rod 34 of the ram 29. An upper pulley 36 is attached to the tubular casing 38 of the jackleg 25. One end of a cable 40 is attached to the casing, the other end being attached to the side wing.

Figures 3A, 3B, 3C:
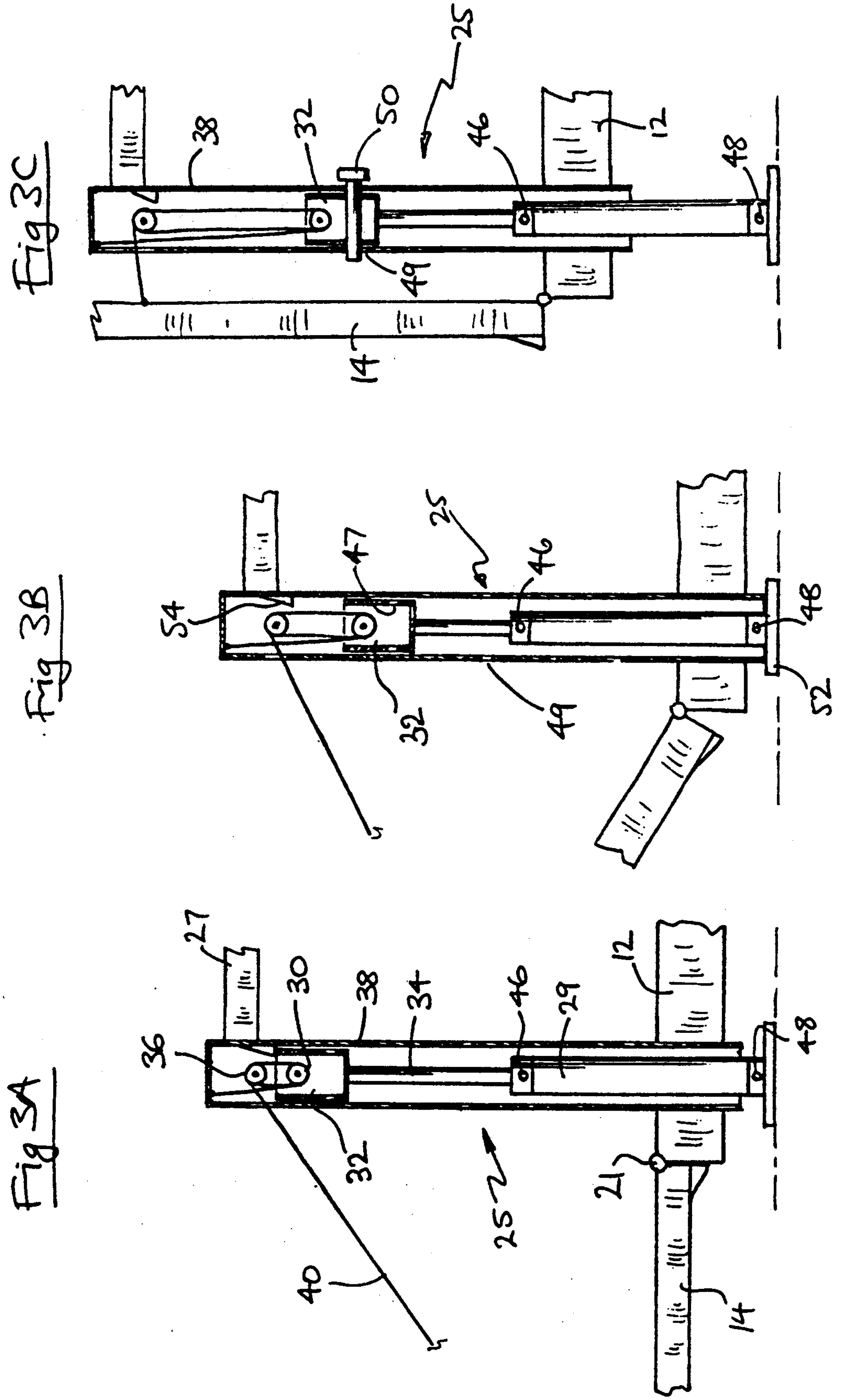
FIGS. 3A, 3B and 3C are cross-sections of a jackleg of the lift of FIG. 1, in various conditions.

FIG. 3A shows the situation within the jackleg at a time when the side wing 14 is resting on the ground. This condition is described in more detail below. To raise the side wing, fluid pressure is applied to the piston-side of the ram, at port 46, and the pulley 30 is drawn downwards.

In fact, although only one pulley is shown, there are two pulleys at 30, these two being rotatable independently about the one pulley spindle. Similarly, there are two pulleys at 36. The cable passes round all four pulleys in such a manner that, for every unit of travel of the piston rod 34, the cable travels 4 units.

FIG. 3B shows the situation where the side wing is being raised. It will be noted that as the side wing is raised beyond a certain point, its centre of gravity is such that the weight of the side wing will now come off the cable, and the side wing will tend to fall over towards the fully folded position. Spring cushions (not shown) are provided to control this tendency, and to maintain tension within the cable 40. It should be noted that, before the side wing is raised, the crossbeam 20 should be firmly secured to the corner pillars 16 (or to some other suitable part of the side frame) to prevent the crossbeam sliding along the pillars as the pillars become horizontal.

FIGS. 6 and 7 show an alternative manner of arranging the side wing lifting facility, in which a chain 81 is attached to the side wing 14 in place of the cable 40. A pulley shaft is provided, which is fixed on top of the bar 27, and which carries first 83 and second 85 pulleys. The chain 81 is wrapped around the first pulley 83. A second chain 87 is wrapped around the second pulley 85, and passes over the idler pulley 89, around a pulley 90 which is fixed in the slide piece 32 in a corresponding manner to the pulley 30, and the chain thence is secured to the top of the casing 38.

It should be noted that the chains 81, 87 are wrapped around the pulleys 83, 85 in opposite senses. Also, when the side wing 14 is in the down or operative position, the pulley 85 is fully unwrapped, whereas the pulley 83 is fully wrapped. The arrangement of the pulleys 83, 85 is such that the chains wrap spirally, fuzee-fashion, whereby the effective radius of the pulley changes as the pulley is wrapped and unwrapped. The result is that when the lifting operation of the side wing 14 is just starting, the mechanical advantage of this chain and pulley system is at its greatest: as the side wing rises, the mechanical advantage decreases, but, to compensate, the tension in the chain 81 decreases due to the shortening weight-radius of the side wing. Thus, the pressure in the jacking ram 29 is more nearly constant throughout the side arm raising operation.

It may be noted also, in the FIGS. 6, 7 arrangement, that it is an easy matter to keep the chains always in line with their respective pulleys, and to line up the chains so that the loads due to the chain tensions are fed centrally into the frame.

Figure 2A:
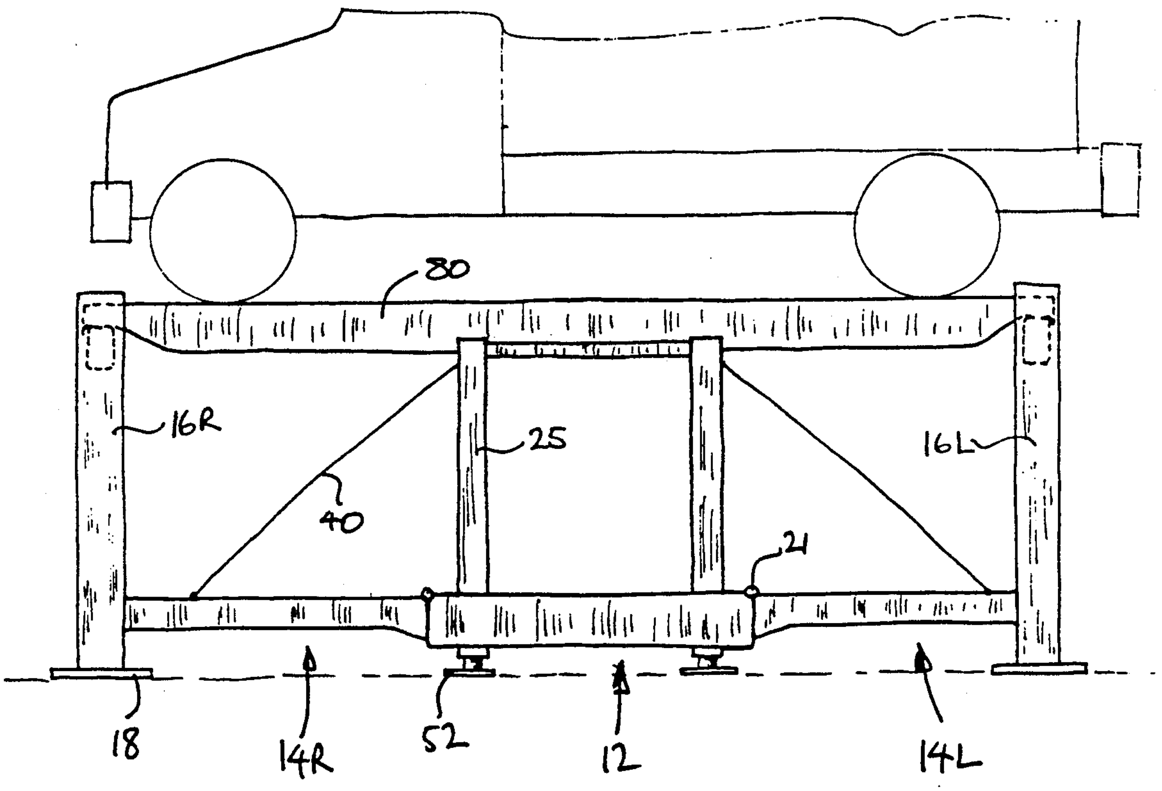
FIGS. 2A and 2B are end elevations showing the lift in (A) an operational condition, and in (B) a fully folded and stowed condition.
Figure 2B:
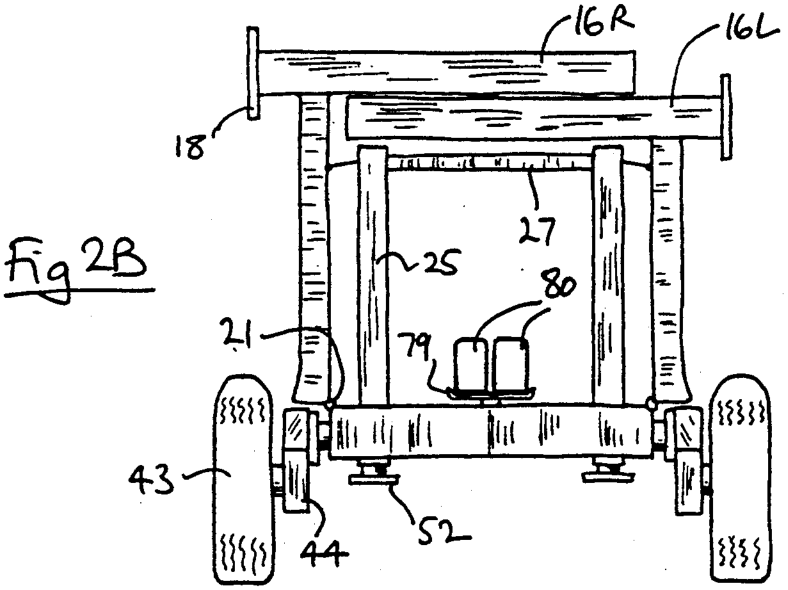

FIGS. 2B and 3C show the situation where both side wings have been fully raised and stowed in position. It should be noted that the lift is not quite symmetrical, in that one side wing 14R is slightly wider than the other 14L. The purpose of the unequal widths is to allow one side wing to reside above the other, as shown in FIG. 2B. The two side wings may be raised in unison, or separately.

To finally prepare the folded-up lift for the highway, it is necessary to fit road-wheels. The left road-wheels 43 are secured to a left sub-frame 44, which bolts onto a left stub-axle 45, which is secured into a suitable member of the base frame 12. In order to fit the wheels, the folded-up lift must be raised clear of the ground, and the jacklegs 25 are designed to achieve this function also.

For jacking the folded-up lift, the following procedure is used. At the time when jacking is to take place, the side wings 14 are fully raised, so that the piston rod 34 is fully retracted into the ram 29, and there is pressure applied to the top port 46 of the ram. At this point also, the slide-piece 32 is at the bottom of its travel within, and relative to, the casing 38. A hole 47 is provided in the slide-piece 32, and a complementary hole 49 is provided in the casing 38: the two holes 47, 49 are so arranged that it is possible, now that the side wing has been fully raised, to slide a peg 50 right through the casing and through the slide piece, thus locking the slide-piece to the casing. Once the peg 50 is inserted, the pressure above the piston rod may be released, because the peg will now ensure that the cable 40 cannot become slack.

As shown in FIG. 3C, the peg 50 has been inserted. To jack the lift, fluid pressure is applied, this time to the bottom of the ram 29, at port 48. The plate 52 at the foot of the jackleg 25 therefore descends, causing the casing 38 to ascend, and with it the folded-up lift.

Preferably, all four of the jacklegs should be operated simultaneously to ensure an even jacking action.

Once the lift has been jacked up the wheels may be secured in place. Pressure is then applied once more to the piston-end ports 46, to raise the plates 52. The folded-up lift is then ready for the highway.

Upon arrival of the lift at a new site, the lift is jacked up, the road wheels are removed and set aside, and the side wings are lowered, basically by a reversal of the above described procedure.

Once the side arms are lowered, and the cables 40 become slack, it is necessary to ensure that the feet 18 of the four corner pillars 16 are all at the same level. If the ground is slightly uneven (the lift is not of course used where the ground is grossly uneven) shims may be placed underneath the feet 18, as required.

It is necessary to ensure not only that the corner pillars 16 are firmly supported all at the same level, but also that the four corner pillars are vertical and parallel to each other, and remain so as the crossbeams 20 are raised and lowered while carrying the full weight of the load. In addition to their other functions, as described, the jacklegs 25 are designed so as to assist also in providing a means whereby the corner pillars 16 remain vertical and parallel, without the need to resort to heavy, rigid (and therefore expensive) structures. This function of the jacklegs will now be described.

In order to maintain the corner pillars in the vertical, parallel condition, it is necessary to make sure that the hinges 21 remain firmly open, i.e. that the face 56 on the base frame 12 remains firmly in contact with the face 58 on the side wing 14. The hinges 21 must remain firmly open, with the faces 56, 58 in contact, during hoisting, and while the vehicle is elevated.

It is therefore preferred to provide a means for generating a force on the frame, being a force which acts upwards against each hinge 21, to keep the hinge firmly open. Such a force should not be excessive, however, or the hinges may be damaged. One approach to this requirement would be to locate a spring underneath each hinge to resiliently push the hinge area of the frame upwards, relative to the ground underneath, thus biassing the hinge open. In the invention, it is recognized that it is possible to achieve this spring function by using the jacklegs 25.

The slide-piece 32 is slidable up and down within the jackleg. The top limit of the travel of the slide-piece 32 is defined by the engagement of the slide-piece with a stop 54 formed on the casing 38. (It is arranged that the cable 40 becomes fully slack before the slide-piece reaches this point.)

With the slide-piece 32 against the stop 54, fluid pressure applied at port 48 to the bottom of the ram 29, i.e. below the piston, causes the plate 52 to descend. Once the lift has been set so that all four corner pillars are level, fluid pressure is applied to the bottoms of all four rams 29, so that all four plates 52 descend, and make contact with the ground.

As mentioned, if the pressure applied to the jacking rams 29 at this point were to be excessive, the hinges 21 would be overstrained: but so long as the pressure remains light, the pressure serves to maintain the hinges open. It is also important that the hinge-opening force be resiliently applied, because the frame will inevitably deflect somewhat when the load is hoisted, and resilience ensures that the force on the hinge remains reasonably constant. Thus, it is preferred to maintain the fluid supply to the jacking rams 29 at a constant pressure, and this can be done by connecting the bottom ports 48 of all four rams 29 to a common reservoir of pneumatic air pressure.

Thus the jacklegs 25 serve three functions: to pull the cables to raise the side wings; to jack the folded-up frame for assembling the road wheels; and to keep the hinges 21 properly open during operation of the lift.

The manner in which the crossbeam 20 is raised in its corner pillars 16F, 16B will now be described.

Figure 5:
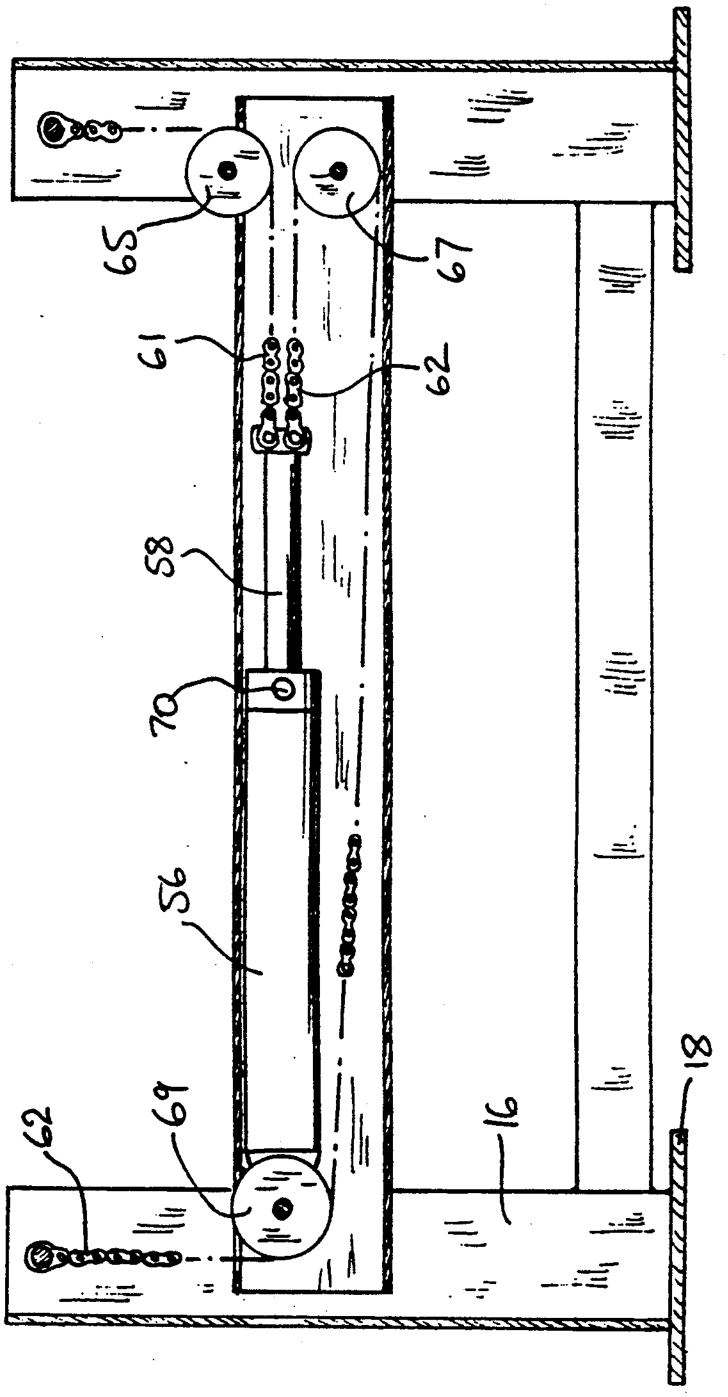
FIG. 5 is a cross-section of a crossbeam, and its associated pair of corner pillars, of the lift of FIG. 1.

The crossbeam 20 is constructed of hollow-section steel tubing, and, as shown in FIG. 5, a hydraulic actuator 56 is positioned inside the hollow crossbeam. The actuator 56 is provided with a piston rod 58. Secured to the outer end of the piston rod 58 is an adapter, which serves as an attachment point for the ends of two chains 61, 62.

Mounted on the crossbeam 20, for rotation thereon, are three pulleys 65, 67, 69. The chains pass around the pulleys as shown in FIG. 5, and the other ends of the chains are attached to the tops of the two corner pillars 16F, 16B.

To raise the crossbeam 20, a source of pressurized fluid is applied to a hydraulic port at 70. The piston rod 58 thereupon retracts, applying tension to the chains 61, 62. The reactions to the chain tensions, via the pulleys 63, 67, 69 as may be seen in FIG. 5, are applied to the crossbeam, and cause the crossbeam to rise.

The arrangement as shown, whereby the two chains are constrained to move in unison with the piston rod, ensures that the two ends of the crossbeam 20 rise at exactly the same rate: it is of course a vital safety aspect that the crossbeam cannot become tipped during operation.

It is equally important also to ensure that the crossbeam 20R on the right side wing 14R rises at the same rate as the crossbeam 20L on the left side wing 14L. Preferably, therefore, the left and right hydraulic actuators 56L, 56R are supplied by hydraulic pumps arranged in tandem, i.e. the pumps are of the positive displacement type, and are of nominally the same volumetric capacity per revolution, and are driven at the same speed, preferably off the same motor shaft. Arranging the fluid supply in tandem in this manner is conventional, and is not described further.

The lift is provided with a pair of vehicle-receiving runways 80, which rest on, and hook over, the crossbeams 20 during operation of the lift.

Provision is made for the runways 80 to rest lengthwise along the major length of the rectangular base frame 12, when the lift is folded up, and for the runways to be transferred to that position without the need for the (heavy) runways to be lifted manually. This provision will now be described.

Figure 4:
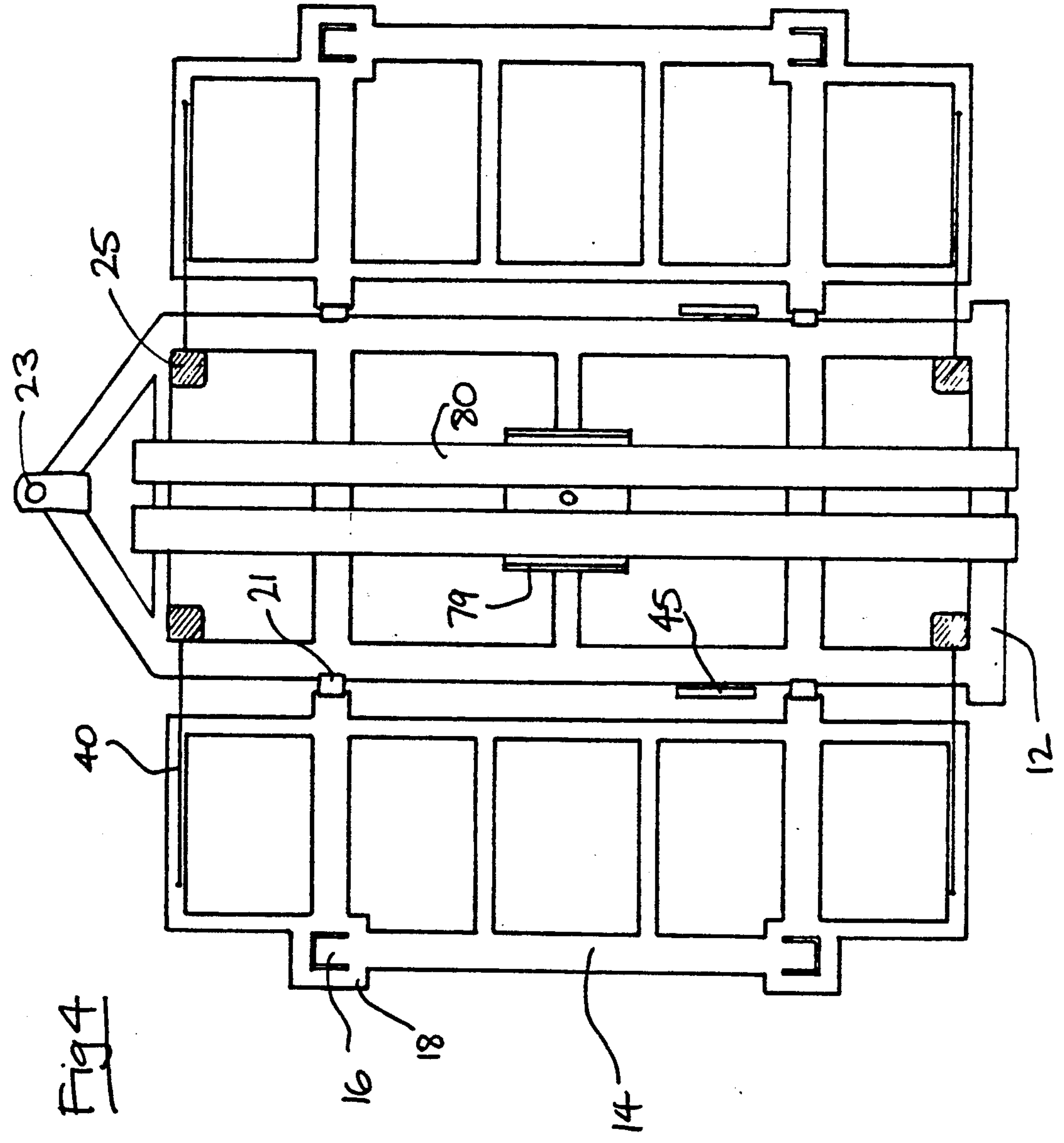
FIG. 4 is a plan view of the lift in the operational condition.

At the end of operations, the vehicle is lowered, and driven off (suitable ramps, not shown, being provided to enable the vehicle to mount and demount the runways). The crossbeams 20 and runways 80 are now at the lowest point of their travel, and the arrangement is such that the runways at this point lie just clear above the base frame 12 and the side wings 14. Now, the operator pushes the runways laterally along the crossbeams, until both runways rest beside each other at the midpoints of the crossbeams. The operator raises the runways, by raising the crossbeams 20 by means of the actuators 56, a sufficient distance that he can place a platform 79 underneath the runways: this platform becomes a turntable upon engaging a suitable socket in the base frame 12. The operator then lowers the crossbeams down until the runways 80 are supported on the turntable 72. He may now easily rotate the runways, by hand, to the fore-and-aft (lengthwise) position in the base frame 12, as shown in FIG. 2B and FIG. 4.

It is contemplated that the runways 80 may be extended lengthwise, whereby extensions to the runway would protrude outside one, or both, of the cross beams 20. The section of the runway is hollow, and the extensions may be stored within the hollow interior. The extensions can be useful when accommodating vehicles which are longer than usual, but which are still of course within the weight limits of the lift, as is the case with some buses for example.

It may be noted that the runways 80, being subject directly to the weight of the vehicle, will bend or sag to some extent. The magnitude of the sag deflection can be measured fairly easily, for example by arranging a beam of light to shine from end to end along the runway and by providing a sail which moves into the path of the beam, thereby breaking an electrical circuit, if the runway should deflect beyond a predetermined limit. Such a signal may be used, for example, to prevent the cross beams from being raised.

DESCRIPTION OF GENERAL FEATURES OF THE INVENTION

The first aspect of the invention lies in the layout of the base frame and side wings, and in the manner these components are arranged for folding. The first aspect applies only to portable, fold-up lifts, and not to fixed, or built-in, lifts.

In the first aspect, the corner pillars are located not as permanent fixtures unitary with a massive base frame, but the corner pillars are unitary with folding side wings. When the side wings are folded, the corner pillars therefore become misaligned relative to each other. When the side wings are arranged to pivot upon hinges, which is the preferred manner by which the lift is folded, the corner pillars change from being vertical, parallel, and widely spaced, when the lift is in the operating condition, to lying horizontal and flat against each other, when the lift is in the transit condition.

It is recognized that when the corner pillars are placed on the folding side wings, the corner pillars may be spaced widely enough apart to accommodate the width of the widest road vehicle.

When planning the design of a lift, the designer must provide two pairs of corner pillars, together with crossbeams bridging each pair, and also runways straddling the crossbeams. When in transit, the lift becomes, in effect, a road vehicle in it own right: the regulations and other limitations on the size and shape of road vehicles dictate that the overall dimensions (at least in plan view) of the lift, when folded into the transit condition, are in fact virtually the same as the overall dimensions of the vehicle which is to be raised by the lift.

The designer is therefore naturally led to arrange things so that the vehicle to be lifted is driven onto the lift in the same direction as that in which the folded-up lift travels along the highway. In the invention, it is preferred that the vehicle to be lifted is driven onto the lift in the direction at right angles to the direction in which the folded-up lift travels along the highway.

This arrangement permits the corner pillars to be very well spaced apart, wider in fact than the width of the base frame. Thus, the lift can accommodate the widest vehicle likely to be encountered. The arrangement also carries virtually no inherent restriction regarding the length of the vehicle to be accommodated: it will have been noted from the drawings that the designer really has no difficulty in providing an ample distance between the two crossbeams, to accommodate the length of a large vehicle.

One aspect of this lack of restriction on the size of vehicle that can be received arises because the lift is designed to accommodate the vehicle with the vehicle's length disposed at right angles to the direction of travel of the lift.

The second aspect of the invention is suitable for use with fixed or built-in lifts, as well as being suitable for use with portable lifts.

In the second aspect, the hydraulic actuator which constitutes the means for raising the crossbeam on the corner pillars lies along the length of the crossbeam. This location may be contrasted with the conventional lift in which a designer places the hydraulic actuator in an upright position, within the corner pillar itself.

Preferably, the actuator is coupled to two chains, which run around pulleys placed at the ends of the crossbeam, and thence up to the tops of the corner pillars. In this arrangement, the forces acting on the components of the lift are kept to a minimum, and it turns out that those components that do undergo heavy forces have to be highly robust in any case, in order to satisfy other load-carrying requirements.

One limitation on this second aspect of the invention is that the height of the powered rise of the lift cannot exceed one half of the length of the crossbeam. If the powered rise is to be the normal 1.5 meters or so that is needed for comfortable working beneath a raised vehicle, the crossbeam must be 3 meters long. Thus, the second aspect of the invention comes into its own when the crossbeam is long, i.e. when the lift is designed for use with wide vehicles.

It is recognized in the invention that putting the actuator 56 inside the crossbeam 20 has certain benefits.

It will be noted that the magnitude of the force acting on each corner pillar 16 cannot exceed the magnitude of the tension in the chain. This may be contrasted with some other designs of lifts, in which the arrangements of chains and pulleys are such that a pillar experiences a compressive force equal to twice the chain tension, or more. Whilst the pillar 16 must of course be adequately robust, the low demands placed on the pillar mean that the design of the pillar in respect to its other functions need not be compromised by the need for a large bulky cross-section, to keep the pillar from buckling.

The crossbeam, on the other hand, experiences a compressive force equal to the sum of three chain tensions. This does require a large bulky cross section. However, in the invention, the cross-section of the crossbeam in any case must be large and rugged, because the crossbeam is subject to large bending moments. Thus, although multiplications of the chain tension are experienced by some components—i.e., by the crossbeams—the components which are exposed to the large forces are components which already have to be extremely rugged, in which therefore the extra requirements are easily met.

It will be noted that the travel of the chains 61,62 is in a one-to-one relationship with the stroke of the hydraulic actuator 56. Thus, if the powered rise of the lift is to be, for example, 1.5 meters, the actuator 56 must have a stroke length of 1.5 meters. This means that the elongated length of the actuator 56 is at least 3 meters. Such a length of course can only be accommodated if the crossbeam is more than 3 meters long, and it will therefore be appreciated that the arrangement of placing the hydraulic actuator inside the crossbeam, on a one-to-one stroke relationship with the chain travel, is only practicable with lifts that are intended for use with large vehicles such as trucks, where the width of the vehicle to be accommodated between the pillars is in excess of 3 meters. If the length of the crossbeam were much less—say, 1.8 meters, as is the case with most car-hoists—a powered rise of only 0.9 meters is all that could be achieved if the actuator and chains were arranged as shown in FIG. 5. But, if the height of the powered rise were less than 1.5 meters, it would not be possible for a person to comfortably work underneath the raised vehicle. Thus, the arrangement of the actuator and chains as shown is only favourable in the case where the width of the lift, i.e. the length of the crossbeam, is more than twice the required height of the powered rise of the lift.

It is recognized in the invention, however, that when the lift is wide enough that the arrangement as shown is possible, the arrangement is most economical as regards the cost of the components needed, in terms of the magnitude of the stresses applied, and in terms of the nature of the components to which those stresses are applied.

As mentioned above, each pillar 16 has no need to support any force in excess of the chain tension appropriate to that pillar. Thus the cross-section of the pillar does not need to include a large, enclosed, area, which would be needed if the pillar had to provide anti-buckling resistance to a large downward force. The cross-section of the pillar may be a simple channel shape, whereby the pillars are well suited for serving as guideways for the up/down movement of the ends of the crossbeam. The edges of the channel section may be reinforced with tubes, as shown.

The base frame and side wings are provided with flooring, not shown, upon which the service operations stand. If the lift is to be used for the operation of spraying the undersides of vehicles with corrosion inhibiting liquid, the flooring may incorporate suitable channels to conduct the excess to a drain.

I claim:

1. Portable lift for large vehicles, wherein:

the lift includes a base frame (12) which comprises a generally rigid rectangle, and two side wings (14) which comprise generally rigid rectangles, having respective short and long edges;

the side wings are movable with respect to the base frame between an operational position and a transit position;

the lift includes four corner pillars (16), a first pair of the corner pillars (16RF,16RB) being unitary with, and rigid within, a first one of the side wings (14R), the other pair of corner pillars (16LF,16LB) being unitary with, and rigid within, the other one of the side wings (14L);

the lift includes two crossbeams, one (20R) of which bridges across between, and is raisable upon, the first pair of corner pillars (16RF, 16RB) and the other of which bridges across between, and is raisable upon, the other pair of corner pillars;

the lift includes means (56) for raising the crossbeams with respect to the corner pillars;

the lift includes runways (80) which, when the side wings are in the operational position, straddle the two crossbeams;

and, in the transit position, the side wings lie folded upon the base frame, in such a manner that the overall outline of the whole folded lift substantially does not exceed, when viewed in plan, the overall outline of the base frame.

2. Portable Lift of claim 1, wherein:

each said pair of corner pillars is disposed such that a line joining the two pillars, when the side wings are in the operational position, lies parallel to the long edges of the base frame;

the said crossbeams both lie parallel to the long edges of the base frame;

in the operational position, the base frame and the two side wings are, when viewed in plan, laid out flat, beside each other, the base frame lying between the two side wings, which are disposed each with one of their long edges substantially in abutment with the long edges of the base frame;

and, in the operational position, the pairs of corner pillars lie substantially upon the other of the long edges of the side wings.

3. Portable lift of claim 2, wherein the lift is provided with road wheels, and is suitable for motion along a highway, and the direction of the said motion is parallel to the long edges of the base frame.

4. Portable lift of claim 2, wherein:

each side wing is hinged to the base frame, and the axis of hinging lies along the line of the abutment between the side wing and the base frame;

and the lift includes means for raising the side wings about the said axes of hinging.

5. Portable Lift of claim 4, wherein:

the lift includes jacklegs (25) and the said means comprises hydraulic rams, positioned within the jacklegs;

and the jacklegs are so arranged that the rams, in addition to their being usable to raise the side wings, are also usable for jacking the whole lift.

6. Portable lift of claim 4, wherein:

the means for raising the side wings includes:

a flexible tension link, which is operatively secured to one of the side wings, and which is wrapped around a pulley;

a means for rotating the said pulley;

wherein the said link is wrapped spirally around the said pulley, whereby the effective operational radius of the pulley increases as more of the chain is wrapped onto the pulley;

and the arrangement is such that the mechanical advantage of the pulley is large when the side wing is at or adjacent to the operational position and is small when the side wing is at or adjacent to the transit position.

7. Lift for wide vehicles, wherein:

the lift includes two pairs of corner pillars, and two crossbeams;

one of the crossbeams (20R) bridges across between the first pair of corner pillars (16RF,16RB), and the other crossbeam (20L) bridges across between the other pair of corner pillars (16LF,16LB), the arrangement being such that the lengths of the said crossbeams (20) lie parallel to each other;

the lift includes runways (80) which straddle the two crossbeams, whereby the lengths of the runways lie at right angles to the crossbeams;

the arrangement of the lift is such that a vehicle to be lifted is so positioned on the lift that the length of the vehicle is disposed along the length of the runways;

each crossbeam is provided with a respective hydraulic actuator (56) which is selectably actuable to raise and lower the crossbeam with respect to the pair of corner pillars;

and each actuator is mounted with its axis positioned along the length of the respective crossbeam, and between the two corner pillars comprising the pair of corner pillars corresponding to that crossbeam.

8. Lift for wide vehicles, as claimed in claim 7, wherein:

the actuator comprises a cylinder member and piston member;

one of these members is secured to the crossbeam, and the other member (58) is movable along the length of the crossbeam;

two flexible tension links (61,62) are secured to the said movable member, and are operatively engaged with one each of the pair of corner pillars.

9. Lift for wide vehicles, as claimed in claim 8, wherein:

a first pulley means (65) is provided at a first end of the crossbeam;

the first flexible tension link (61) passes from the said movable member, around the first pulley means, and thence upwards to the top of that corner pillar which lies at the first end of the crossbeam;

a second pulley means (67) is provided at the same end of the crossbeam as the first pulley means, and a third pulley means (69) is provided at the opposite end of the crossbeam from the first pulley means;

the second flexible tension link (62) passes from the movable member, around the second pulley means, back along the length of the crossbeam, around the third pulley means, and thence directly to the top of the corner pillar that lies at the said opposite end of the crossbeam.

10. Lift for wide vehicles, as claimed in claim 7, wherein:

the height of a powered rise through which the crossbeams can be raised and lowered is approximately 1.5 meters;

and the length of the crossbeam is at least double the height of the powered rise.

* * * * *